INVENTOR:
RICHARD K. SUTZ
BY J. B. Burke
ATTORNEY.

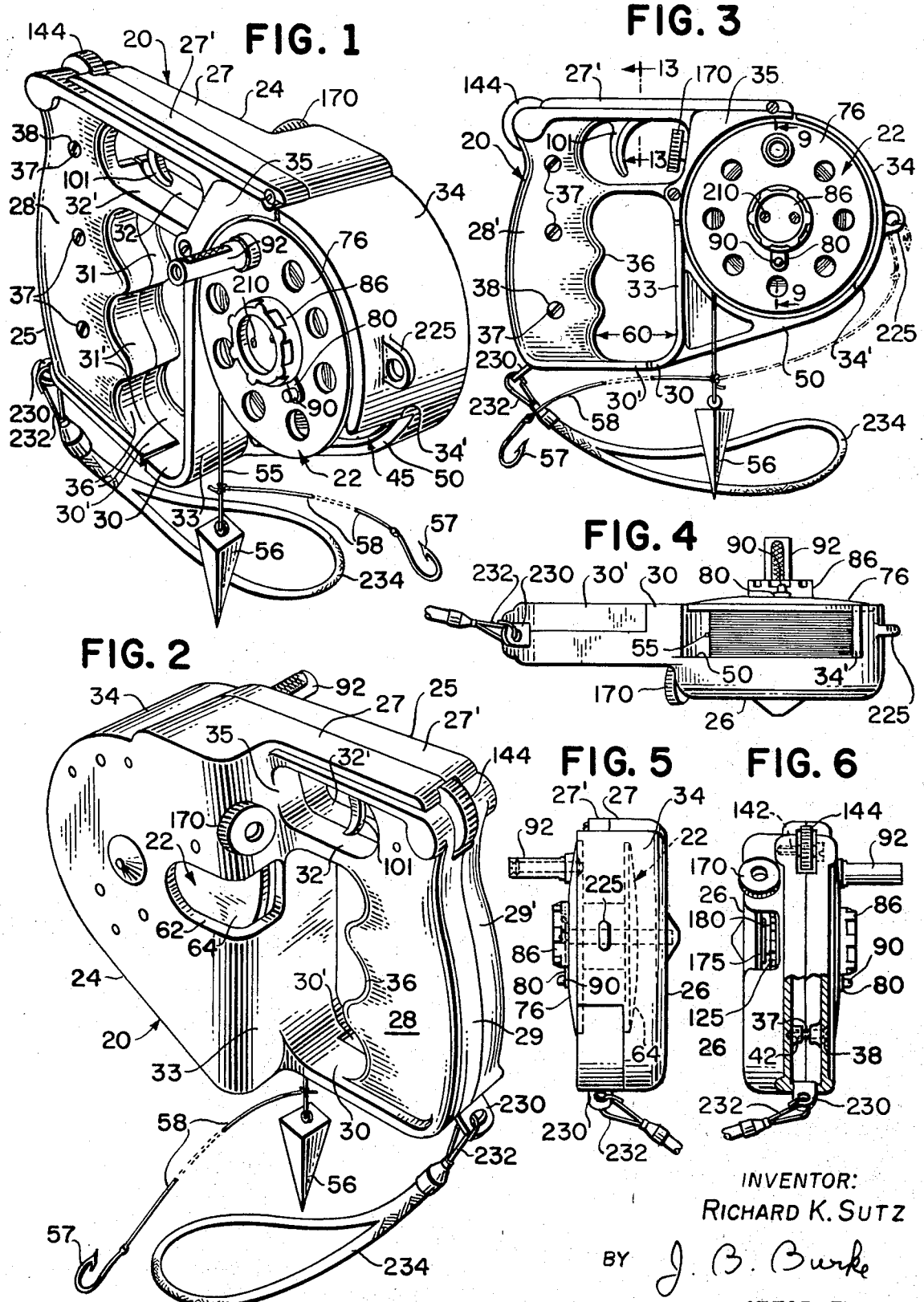

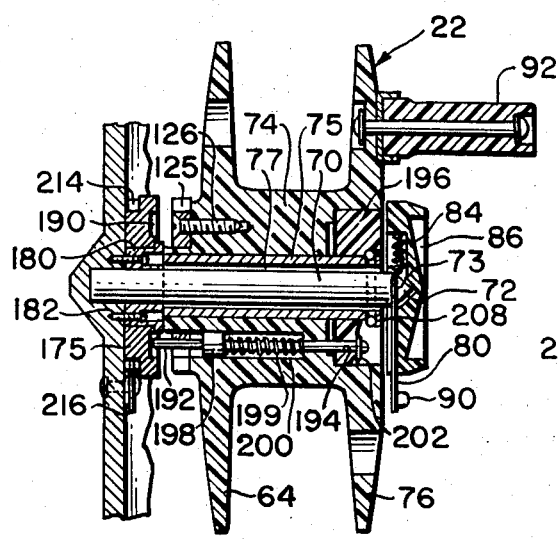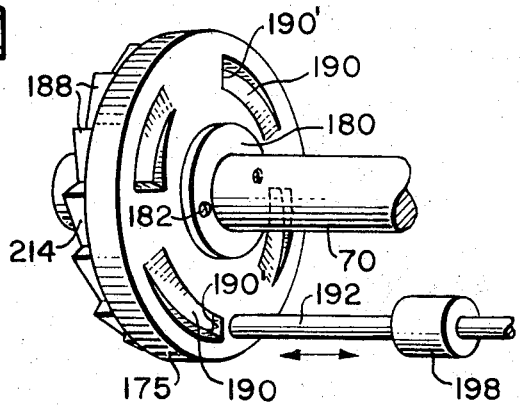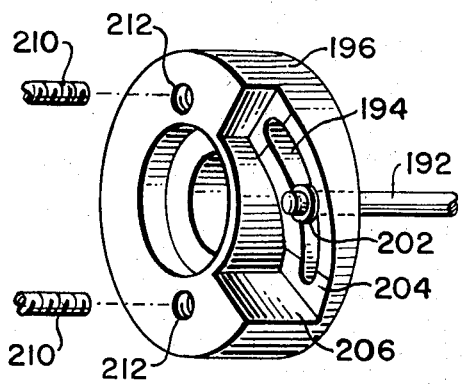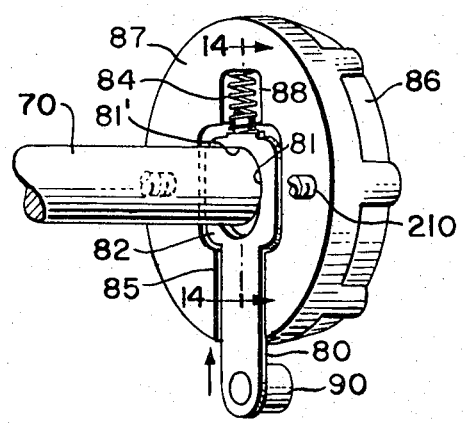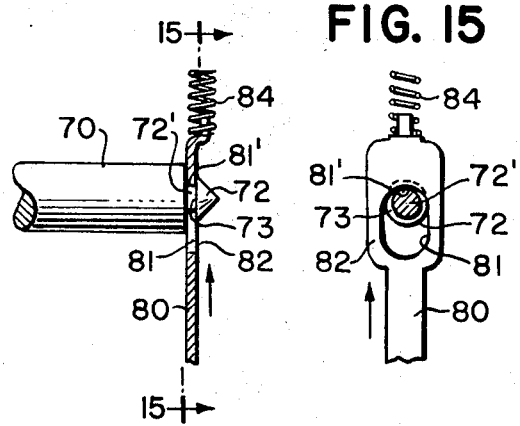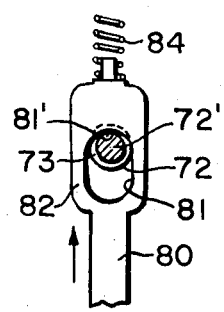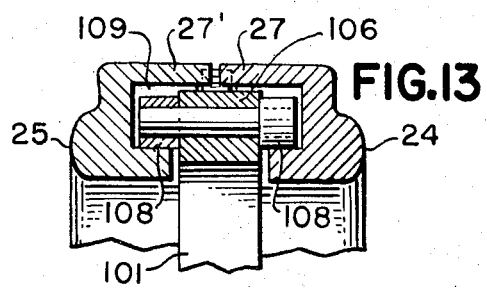

United States Patent Office 3,532,289
Patented Oct. 6, 1970

3,532,289
SPORT FISHING REEL
Richard K. Sutz, 5800 Arlington Ave.,
Riverdale, N.Y. 10471
Continuation-in-part of application Ser. No. 690,246,
Dec. 13, 1967. This application Nov. 14, 1968, Ser. No.
775,594
Int. Cl. B65h 75/40
U.S. Cl. 242—99                                    10 Claims

ABSTRACT OF THE DISCLOSURE

This sport fishing reel has a hand held frame in which is a rotatable spool. A trigger operated ratchet releasably controls rotation of the spool for playing out a line from the spool. A knob actuated plunger controls application of drag on the spool. Another knob adjustably varies the drag on the spool. Drag is also controllable and adjustable manually by finger pressure on the spool independently of the drag control and adjustment mechanism.

---

This application is a continuation-in-part of my copending application Ser. No. 690,246, filed Dec. 13, 1967, entitled "Sport Fishing Reel," now Pat. No. 3,476,332, issued Nov. 4, 1969.

The invention concerns a fishing reel especially adapted for still fishing. The fishing reel is intended for use by a fisherman while he is physically immersed or entirely submerged in water, suitably attaired in snorkel or scuba equipment. The reel can also be used by a fisherman while engaged in still fishing off a boat, pier or bridge.

Sport fishing as generally practised, involves three common methods: casting, trolling and still fishing. In casting and trolling, a fishing pole is generally used. Still fishing can be practised with or without a pole. Heretofore still fishing has been conducted with hand lines alone, or with lines engaged on poles such as used in casting and trolling. None of these prior fishing devices is adapted for use by a fisherman optionally above water or while swimming underwater where casting and trolling cannot be practiced.

According to the invention there is provided a reel specifically adapted for a fisherman while underwater. Such a reel must meet several unusual requirements not necessary for overwater fishing. In the first place, the fisherman must be able to see the fish to be caught before the line is fully played out. He should also be able to see the fish before starting to play out the line. He should also be able to see the fish while it is taking the hook and after the fish has taken the hook. Secondly, the reel must not interfere with the mobility of the fisherman while he is underwater. Thirdly the reel must provide fine, instant control for playing out the line, effective braking and holding of the line, adjustable or variable drag in playing out the line, and full freedom in reeling in the line.

The present invention meets all the above requirements and in addition provides other desirable features. The present invention involves improvements over those described in my prior application above mentioned. In the prior sport fishing reel a finger operated lever actuates a ratchet to stop rotation of the spool in the reel. The same lever also adjustably applies drag to the spool. In the present invention by contrast, a trigger operated by the index finger of the fisherman's hand holding the reel actuates a ratchet to stop rotation of the spool. A mechanism is provided in which a knob operated plunger controls rotation of a brake drum for application of drag to the line. Another knob adjusts braking pressure on the drum so that the drag is variable at will. In addition, the frame of the reel is so arranged that the fisherman can vary drag on the rotating spool by applying his index finger independently of the trigger or either knob. In a simplified version of the reel, the drag mechanism is omitted, but the fisherman can still apply drag by the index finger of the hand which holds the reel, and he can control stopping of the reel by operation of the trigger.

The invention is explained in further detail in the following description taken together with the drawings, wherein:

FIG. 1 is a perspective view showing the front end and one side of the reel.

FIG. 2 is a perspective view showing the rear end and other side of the reel.

FIG. 3 is a reduced side elevational view of the reel.

FIG. 4 is a reduced bottom plan view of the reel.

FIG. 5 and FIG. 6 are reduced front end and rear end elevational views respectively.

FIG. 9 is an enlarged sectional view taken on line 9—9 of FIG. 3.

FIG. 10 is an oblique view of a brake drum and drag pin.

FIG. 11 is an enlarged oblique view of a cam which operates the drag pin.

FIG. 12 is an oblique enlarged view of a knob which controls the drag pin, shown with an associated catch member for the spool.

FIG. 13 is an enlarged fragmentary sectional view taken on line 13—13 of FIG. 3.

FIG. 14 is an enlarged fragmentary sectional view taken on line 14—14 of FIG. 12.

FIG. 15 is a fragmentary sectional view taken on line 15—15 of FIG. 14.

Figure 7:
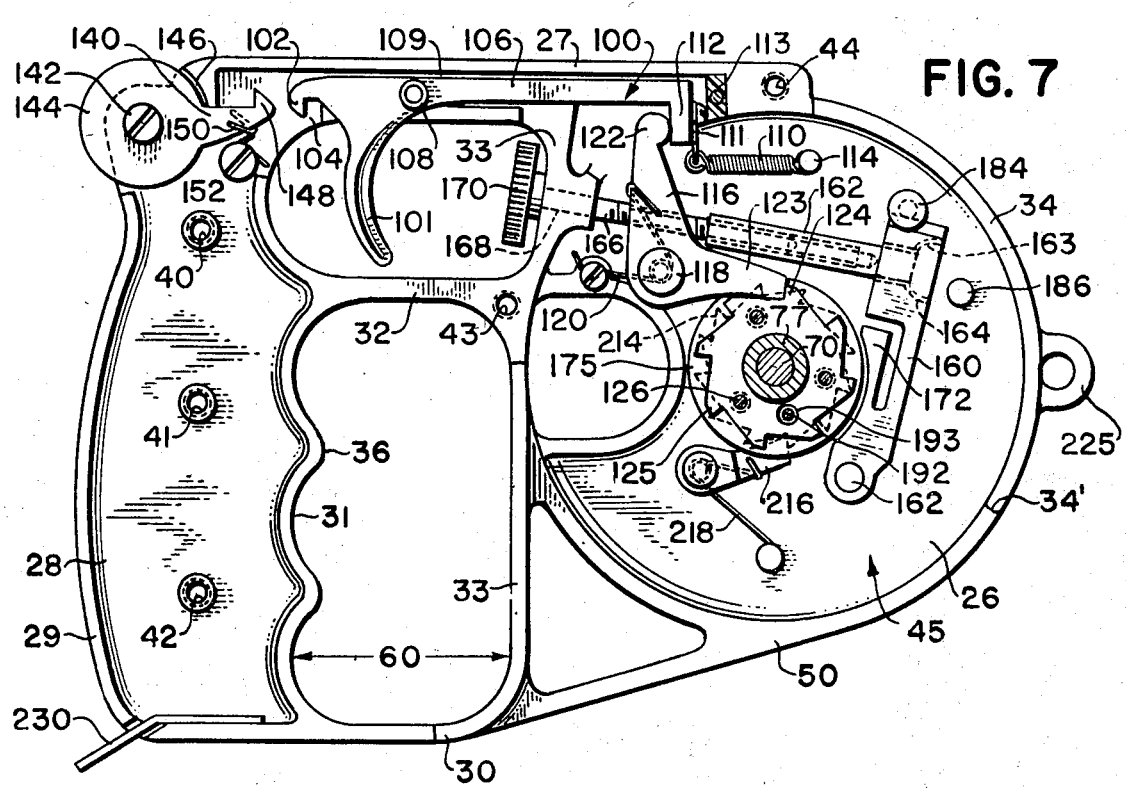
FIG. 7 is an enlarged side view of the reel with spool and one part of the reel frame removed.

Referring first to FIGS. 1, 2 and 3, the reel is shown including a frame 20 in which is rotatably mounted a spool 22. The frame includes two sections 24 and 25. Main section 24 has a side wall 26, a long flat top wall 27, a narrow flat side wall 28, vertical rear end flange 29, bottom wall 30, inner flange 31, cross flange 32, a vertical intermediate wall 33, and a front cylindrical wall 34. Frame section 25 laterally abuts and interfits with frame section 24 to complete the frame. Frame section 25 has a long, narrow top wall 27', side wall 28', rear end flange 29', inner flange 31', bottom flange 30', cross flange 32', and arcuate flange 35 integral with top wall 27'. Curved indentations 36 formed in flanges 31, 31' define finger grips. Side walls 28, 28' and end flanges 29, 29' define a hand grip. Screws 37 inserted in holes 38 of frame section 25 are engaged in threaded holes 40–44 in frame section 24 to hold the two frame parts or sections together; see FIG. 7. Curved flanges 34, 35 and side wall 26 define a generally cylindrical well 45 in which spool 22 rotates. A circumferentially extending opening 50 is defined at the bottom of the frame between wall 33 and an axially extending portion 34' of wall 34.

A fishing line 55 wound on spool 22 passes freely through opening 50 as shown in FIGS. 1 and 3. Sinker 56 is secured to the outer end of the line and hook 57 is secured by leader 58 to the end of the line.

A generally rectangular opening 60 is defined between wall 33, inner flange 31, 31', cross flanges 32, 32' and bottom flanges 30, 30'. The fisherman inserts his fingers in opening 60 while his hand grasps the handle or hand grip defined by walls 28, 28' and flanges 29, 29'. A lateral opening 62 is formed in side wall 26 and inner wall 33. This opening extends both radially and axially inward as clearly shown in FIG. 2. The fisherman can touch and frictionally engage circular inner side wall 64 of spool 22 with his index finger. By pressing axially inward with this finger the fisherman can exert a manually adjustable drag on rotation of the spool. This drag can be made effective on rotation of the reel in playing out the line 55 or on reeling in of the line.

An axial shaft 70 is secured in a stationary position at the center of well 45 at side wall 26; see FIGS. 7, 9, 12, 14, 15. Shaft 70 terminates in an undercut conical tip 72 having a circumferential groove 73. Shaft 70 supports rotatable spool 22. Spool 22 has a circumferential hub 74, inner annular side wall 64 and outer annular side wall 76. Walls 64 and 76 are integral with hub 74. A central axial bore 75 is formed in hub 74. Sleeve or bushing 77 is fitted in bore 75. Shaft 70 extends through bushing 77. A slide catch 80 removably holds the spool 22 on shaft 70. As best shown in FIGS. 9, 12, 14 and 15, catch 80 has an end loop 81 formed with an elongated hole 82 which is wider than tip 72 of shaft 70. End 81' of the loop is engaged in groove 73 at neck 72' of tip 72. A coil spring 84 bears on end 81' of the catch loop biasing the catch radially outward of the shaft. The catch is guided in a diametral groove 85 formed in the inner side 87 of a knob 86 rotatably mounted on the outer side wall 76 of the spool. Spring 84 is disposed in a recess 88 in side 87 of the knob. A small knob 90 is provided on the outer end of catch 80 which extends radially beyond knob 86. The spool 22 is released by pushing catch 80 radially inward of knob 86 so that the conical tip 72 which is smaller in diameter than shaft 70 and smaller than the width of hole 82 can slip axially past the rim of hole 82. By pushing the spool axially inward of the shaft 70 and well 45, catch 80 snaps past tip 82, and end 81' of the loop engages under spring bias inside of groove 73 against neck 72' of tip 72 which then holds the spool rotatably on shaft 70. A handle 92 extends laterally outward of side wall 76 of the spool for use in turning the spool.

Figure 8:
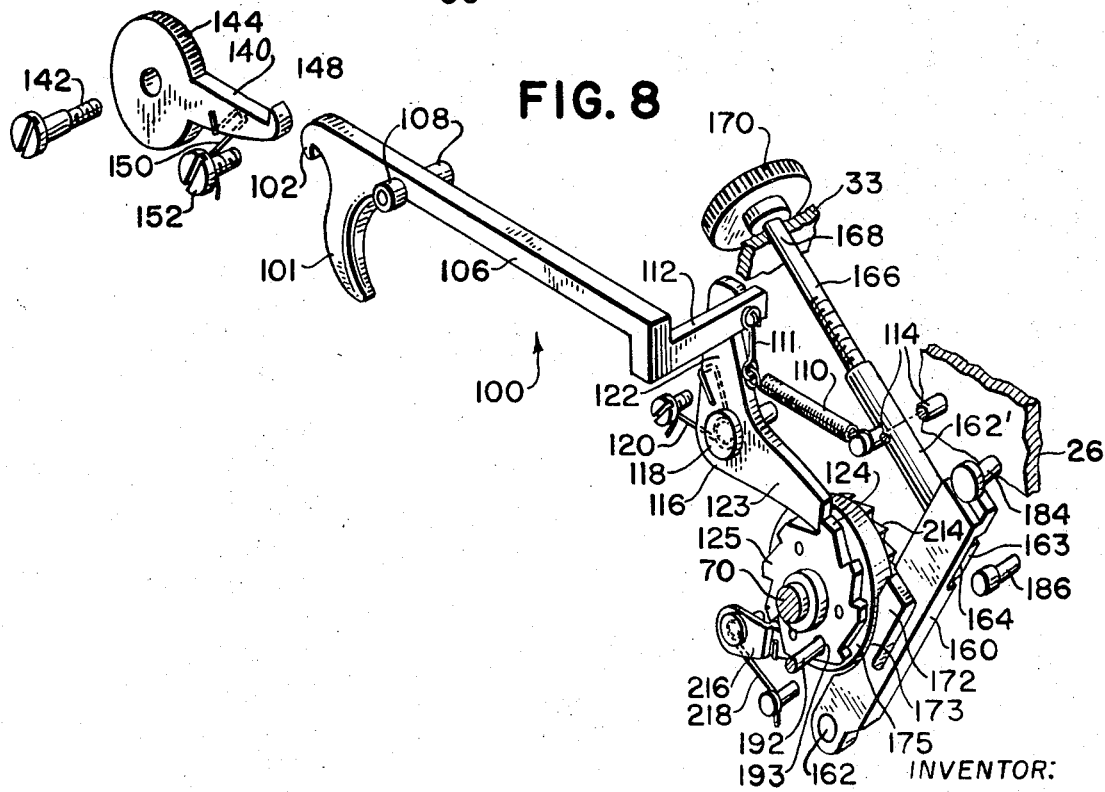
FIG. 8 is an exploded perspective view of parts of a spool locking and drag mechanism employed in the reel.

In order to lock the spool against free rotation in a counterclockwise direction as viewed in FIGS. 1 and 3 to prevent playing out of line 55, there is provided the mechanism 100 shown best in FIGS. 7 and 8. This mechanism includes a trigger 101 having an integral hook 102 at its rear end. The trigger extends downwardly through a slot and opening 104 defined between upper parts of frame sections 24 and 25. The trigger has an integral bar 106 provided with lateral studs 108 which guide bar 106 in channel 109; see FIG. 13. The bar and trigger are urged forward by a coil spring 110 engaged on a clip 111 secured on laterally extending arm 112 at the forward end of bar 106. The forward end of spring 110 is engaged on a pin 114 secured inside of side wall 26. An abutment member 113 stops forward movement of bar 106. An L-shaped pawl 116 is pivotally supported by a pin 118 on wall 26 and is urged by wire spring 120 in a clockwise direction as viewed in FIGS. 7 and 8. The upper arm 122 of the pawl 116 bears against arm 112 and the lower arm 123 of the pawl engages on a tooth 124 of a ratchet 125 secured by screws 126 on the inner side of wall 64 of the spool.

When trigger 101 and bar 106 are in the forward position shown in FIG. 7, spring 110 is contracted and pawl arm 123 engages with a tooth 124 of ratchet 125. If a fish is caught on hook 57 at the end of line 55, the spool will not turn to play out more line while the trigger 101 and bar 106 remain in the forward position. The forward position of the trigger and bar is also used to lock the spool against further rotation after the line is initially played out by the free dropping of sinker 56.

A detent catch lever 140 is provided in mechanism 100 to serve in releasing spool 22 for free rotation in a counterclockwise direction as viewed in FIG. 3 to permit further playing out of the line as the sinker 56 drops further or as a caught fish pulls the line out further. Lever 140 is pivotally mounted by a screw pin 142 at the upper left corner of the reel as shown in FIGS. 1 and 7. The lever has a thumb operated knob 144 which extends outwardly of a slot 146 provided between frame sections 24 and 25. The inner end of lever 140 is formed with a hook 148 which engages with hook 102 of trigger 101 when the trigger is retracted. A spring 150 anchored by a screw 152 on frame section 24 under lever 140 urges the lever upwardly. When trigger 101 is retracted, hook 102 engages with hook 148 while spring 108 is expanded tending to urge bar 106 forwardly. Retraction of trigger 101 and bar 106 rotates pawl 116 counterclockwise as viewed in FIG. 7 and FIG. 8 so that arm 123 becomes disengaged from the ratchet 125. Lever 140 holds the trigger in retracted position while the ratchet 125 remains free so that the spool can rotate freely.

Regardless of the position of the trigger, free rotation of the spool is a clockwise direction as viewed in FIGS. 1, 3 and 7 is always possible for reeling in or winding up line 55. If the trigger is in the forward position of FIG. 7, the fisherman can turn the spool by means of handle 92 and pawl arm 123 will snap past the ratchet teeth 124 as the spool turns.

Mechanism 100 is also provided with means for adjustably applying drag to the spool in playing out the line. A brake bar 160 is pivotally secured by a pin 162 to side wall 26 of frame section 24 in well 45. Bar 160 can be adjusted angularly by means of a sleeve nut 162' having a cross head 163 at one end. This cross head engaged in a recess 164 at the side of bar 160 facing wall 26. Sleeve nut 162' is internally threaded and is engaged by a threaded bolt 166 rotatably journaled in a hole 168 in wall 33 of frame section 24. The bolt or shaft 166 is provided with a knob 170 disposed at the rear side of wall 33; see FIG. 2. Knob 170 can be turned by the left index finger of the fisherman assuming that he holds the reel in his left hand. Turning of knob 170 and bolt or shaft 166 moves the brake bar pivotally. The brake bar has a flexible integral shoe 172 formed with an arcuate recess 173 to engage the rim of a circular drum 175 rotatably disposed in well 45. The drum is held rotatably in the well by a ring flange 180 at the base of shaft 70; see FIG. 10. Screws 182 engaged in side wall 26 hold both the ring flange and shaft 70 stationary in the well. Pin 184 on wall 26 guides pivotal movement of bar 160. Pin 186 on wall 26 stops movement of bar 160 away from drum 175.

In the side of drum 175 facing the spool 22 as best shown in FIGS. 9 and 10, is a plurality of circumferentially spaced camming grooves 190 formed with radial end abutments 190'. The free end of an axially movable pin or plunger 192 engages in grooves 190. Pin 192 is engaged at its other end in an arcuate circumferential groove 194 formed in a cylindrical cam 196 set in recess 198 at the outer side of spool 22; see FIGS. 9 and 11. An enlargement 198 of the pin provides an abutment for coil spring 199 in a bore 200 in spool 22 through which pin 192 extends and in which the pin reciprocates axially. The pin extends through a hole 132 in ratchet 125. An annular flange 202 is provided at the outer end of the pin. This flange slides along the inclined side 204 of a camming section 206 formed in cam 196. Cam 196 is held rotatably on sleeve or bushing 76 by a spring ring 208. Cam 196 is rotated by knob 86 which is connected to the cam by two screws 210 engaged in threaded holes 212 in the outer side of the cam.

On the side of drum 175 facing side 26 of frame section 24 are ratchet teeth 214 engaged by a pawl 216; see FIGS. 7, 8 and 10. Pawl 216 is held against the ratchet teeth by a wire spring 218. The pawl and ratchet are arranged so that the drum 175 cannot rotate in a clockwise direction as viewed in FIG. 7. The drum is limited to rotation in only counterclockwise direction.

In operation of mechanism 100 to apply drag to rotation of spool 22 in playing out line 55, knob 86 will be rotated with respect to the spool in a counterclockwise direction as viewed in FIGS. 1 and 3. This will cause pin 192 to move axially inward as the cam 196 rotates with knob 86. The inner free end of the pin engages one of the grooves 190 in the side of drum 175. Then when the spool 22 is turned to unwind the line, pin 192 engages an abutment 190′ at one end of a groove 190. The drum thus rotates with the spool in frictional engagement with brake shoe 172. The pressure of the shoe on the drum is adjusted by manually turning knob 170. At any time the spool 22 can be turned in opposite direction to reel in the line. The drum will be held stationary by pawl 216 as the spool is turned manually. The pin 192 will slip along the drum past the camming grooves 190 as long as the spool 22 rotates. There will be no braking or drag on the spool in reeling in the line because drum 175 is stationary. At any time rotation of the spool can be reversed and drag will again be automatically reinstituted. If it is desired to stop all drag while playing out the line, knob 86 will be turned clockwise with respect to spool 22 as viewed in FIGS. 1 and 3, and the pin will be withdrawn from the drum by sliding movement of flange 202 on the side 204 of cam section 206. It will then be possible for the fisherman to control drag manually by pressing his index finger against the portion of side wall 64 of the spool exposed at opening 62 in the frame. The lower edge of the opening can serve as a support for the finger pressing against the spool as the spool turns to wind or unwind the line.

It is possible to omit those parts of the mechanism employed for imposing automatic, adjustable drag if a simpler construction is desired for the reel.

An eye 225 is integrally formed with wall 34 of frame section 24 to engage hook 57 when not in use as shown by dotted lines in FIG. 3. Another eye 230 can be provided at the bottom of the hand grip for engaging loop 232 of a wrist strap 234 used in conveniently carrying the reel.

From the foregoing description it will be noted that the reel has the following distinctive features:

(1) Brake operation and trigger operation are independent of each other.

(2) Brake 160 controls drag and is adjustable by control knob 170.

(3) Trigger 101 actuates pawl 116 which engages and disengages ratchet 125 to control locking and unlocking the spool.

(4) The trigger is retracted by movement of the left index finger to disengage the ratchet 125, and the trigger is released by thumb operation of knob 144 to reengage the ratchet.

(5) Finger braking and drag is provided for by exposing a portion of the spool to the left index finger of the hand holding the reel.

(6) Automatic drag is instituted only by turning control knob 86 on the reel.

(7) Automatic drag is deactivated by turning knob 86 on the spool to retract drag pin 192.

(8) While drag pin is extended to drum 175, drag is deactivated by slippage of the pin on the stationary drum when the spool is turned to reel in the line.

The operating procedure for the reel will now be briefly summarized. In use, whether in water or above water, the reel is held in the left hand. While in the water, when the fisherman is swimming, he holds the reel by means of wrist strap 234. The sequence of operation of a reel having variable drag mechanism will be as follows:

(A) *Setting the drag.*—The drag on spool 22 is set by adjusting knob 170 with the left index finger. The spool can be released to test the amount of drag on the line by squeezing the trigger to retract it. For the spool to have drag, the drag pin 192 must be moved axially inward to engage the cooperating grooved surface of the brake drum 175. This is accomplished by turning knob 86 in one direction at the side of the spool to move the pin axially inward. After the drag has been set in preparation for playing out the line freely, knob 86 should be turned in opposite direction to retract the drag pin 192 so as to permit the spool to turn freely when released by the retracted trigger.

(B) *Releasing the spool to play out the line.*—The spool is released by slightly squeezing the trigger with the index finger. This moves trigger bar 106 and lifts pawl arm 123 out of contact with ratchet 125. Line 55 is pulled down by the weight of sinker 56 and plays out freely. Playing out of the line is instantly stopped by releasing the trigger from the index finger. The trigger bar 106 will then move forward under spring tension to engage pawl arm 123 with ratchet 125. If the trigger is squeezed back all the way to engage with hook 148, the trigger will be held retracted and the spool will remain in free turning condition. Rotation of the spool can then be controlled by pressing the index finger against the side wall 64 of the spool.

(C) *Engaging the drag.*—Once the line is extended sufficiently to locate the hook 57 at desired depth in the water, the trigger is released by pressing knob 144 with the left thumb. At this time the drag is activated by turning knob 86 on the spool. This advances the drag pin 192 axially to brake drum 175. Then the trigger is squeezed back all the way to engage hook 148 and lock the trigger in retracted position. Ratchet 125 is disengaged from pawl arm 123. The spool is kept from free rotation by pressure of brake shoe 172 on the periphery of drum 175.

(D) *Retrieving a fish caught on the line.*—When the fish bites, it can be retrieved by turning the spool with the right hand in a clockwise manner as viewed in FIG. 3. While the fish is being played, the drag can be continuously varied by rotating knob 170 with the left index finger.

(E) *Re-setting the reel.*—To release the drag and re-set the reel to lower the line again, knob 144 is depressed with the left thumb. The drag pin 192 is retracted by turning knob 86, and the reel is again set by squeezing the trigger to release ratchet 125, for controlled playing out of the line. Playing out of the line will be controlled by pressing the index finger against the side wall 64 of the spool exposed at frame opening 62.

(F) *Reel stowage.*—For stowing the reel, particularly when the fisherman is in the water, hook 57 should be engaged with eye 225, and the line should be wound up on the spool along with leader 58 until the line is taut.

Operation of a reel without a variable drag mechanism may be done in either of two ways as follows:

(I) The trigger 101 is squeezed back to release ratchet 125 and the line is played out to desired depth. At this depth, the trigger is released to engage ratchet 125 and the line will be held securely in place. When a fish bites, the fisherman retrieves against the load with no possibility of drag being applied.

(II) The fisherman squeezes the trigger all the way back until it is engaged by hook 148. He then controls both playing out of the line with and without drag by selectively pressing his index finger against side wall 64 of the spool at opening 62, and lifting his index finger from wall 64. At any time the fisherman can press knob 144 with his left thumb to release the trigger and lock the ratchet 125 so that the spool is prevented from turning to stop playing out any more line. Reeling in of the line by turning of the spool can however be done freely as pawl arm 123 slips past the teeth of the ratchet 125.

What is claimed is:

1. A sport fishing reel, comprising:
 (a) a generally flat frame having:
  (1) hand grip means at one end of the frame, and
  (2) walls defining a well at the other end of the frame;
 (b) a spool rotatably and removably mounted in said well for holding and playing out a line wound on the spool, said frame further having:

(1) a first opening through which said line freely passes, and (2) a second opening through which a side of said spool is accessible to the index finger of a hand grasping the hand grip for adjustably varying and controlling frictional drag exerted on the spool by said index finger while the spool rotates;

(c) a mechanism including ratchet means in said frame for locking the spool against rotation in one direction only to stop playing out of the line; and (d) a trigger located at said hand grip means and accessible to said index finger for operation thereby said trigger being operatively arranged and connected to said ratchet means for actuating the same to lock the spool against rotation in said one direction and to release the spool for free rotation in said one direction, said ratchet means being so arranged that the spool is freely rotatable in the opposite direction to wind up the line on the spool in all positions of the trigger.

2. A sport fishing reel as defined by claim 1, wherein said mechanism further comprises braking means for applying mechanical drag to rotation of the spool only in said one direction.

3. A sport fishing reel as defined by claim 2, wherein said mechanism further comprises a control manually operable independently of said trigger for selectively actuating said braking means to apply said mechanical drag and to remove said mechanical drag.

4. A sport fishing reel as defined by claim 3, wherein said mechanism further comprises another control manually operable by said index finger independently of said trigger and of the first named control, said other control being operatively connected to said braking means for adjusting the braking means to apply mechanical drag of different magnitudes to the spool.

5. A sport fishing reel as defined by claim 4, wherein said braking means comprises a brake drum rotatably mounted in said well; a brake shoe pivotally disposed in said well to bear against the brake drum for exerting said mechanical drag; and an axially movable pin carried by the spool, said pin being movable in response to operation of the first named control to engage said drum for application of said mechanical drag to the spool.

6. A sport fishing reel as defined by claim 5, wherein said mechanism further comprises mechanical means operatively connecting said other control and said brake shoe to pivot the same for adjusting the magnitude of drag applied to the spool when the first named control is operated to apply said mechanical drag to the spool.

7. A sport fishing reel as defined by claim 1, further comprising manually operable catch means located at said hand grip and arranged to releasably engage said trigger and hold it in retracted position so that the ratchet means is deactivated to free the spool for free rotation in said one direction.

8. A sport fishing reel as defined by claim 5, wherein the first named control comprises a knob rotatably mounted at one side of the spool; and a cam connected to said knob, said pin being guided by said cam for axial movement when said knob is turned with respect to the spool for selective engagement with said drum and for disengagement from the drum.

9. A sport fishing reel as defined by claim 5, wherein said brake drum has at least one abutment formed in one side thereof for engagement by said pin when the pin is axially extended to the drum, said abutment being arranged so that the pin slides along said one side to pass the abutment and permit free rotation of the spool when it is turned in the opposite direction to wind up the line.

10. A sport fishing reel as defined by claim 6, wherein said other control comprises a rotatable knob located near the trigger, and wherein said mechanical means for pivoting the brake shoe comprises threaded mutually engaged sleeve and shaft members, one of said members being connected to the knob and the other member being engaged with the brake shoe, so that turning the knob changes the axial length of the sleeve and shaft members and pivots the brake shoe.

References Cited

UNITED STATES PATENTS

| 1,543,489 | 6/1925 | Wilson | 242—96 |
| 2,515,430 | 7/1950 | Tomala | 242—99 |
| 2,574,216 | 11/1951 | Lindgren | 242—99 |
| 2,984,432 | 5/1961 | Clark | 242—84.53 X |

NATHAN L. MINTZ, Primary Examiner